COMMUNICATION SYSTEM EXCLUSION CIRCUIT

Filed March 3, 1966

ALEX C. MC INTOSH
DARRYL F. PROCTOR
*INVENTORS*

BY Seed & Berry

*ATTORNEYS*

United States Patent Office 3,499,121
Patented Mar. 3, 1970

3,499,121

COMMUNICATION SYSTEM EXCLUSION CIRCUIT

Alex C. McIntosh, Everett, and Darryl Frederic Proctor, Bellevue, Wash., assignors to Proctor and Associates Company, Redmond, Wash, a corporation of Washington Filed Mar. 3, 1966, Ser. No. 531,465
Int. Cl. H04m *3/16*
U.S. Cl. 179—17 8 Claims

ABSTRACT OF THE DISCLOSURE

A telephone exclusion system comprising a diode circuit having an input point and an output point, and having diodes with their polarities arranged in a bridge such that the exclusion circuit can function regardless of the input polarity and such that the current cannot pass from the input point to the output point through the output circuit alone. A Zener diode gates an electrical self-latching semi-conductor above a predetermined voltage level across the input and output points such that the electrical self-latching semi-conductor is actuated and permits passage of current from the input point to the output point but does not become activated below a predetermined voltage level between the input and output points.

This invention relates to communication system exclusion circuits and particularly to automatic solid state exclusion circuits for maintaining the privacy of telephonic communications.

Where multiple telephones have access to a common line, or lines, it would often be desirable to prevent telephone interruptions of the privacy of a conversation in progress so that such conversation would remain private. Heretofore, two general types of telephone exclusion systems have been proposed. One type requires special telephones and special wiring such that a single line comes into one primary telephone and branches at that telephone to one or more extension telephones. A conversation on the primary telephone can be made private on that line by manually switching the extension telephones off that line. This type of exclusion system provides privacy only for the primary telephone and only when that particular line is used. Conversations on the extension telephones cannot be made private by excluding other system telephones. Further, this type of exclusion system can only provide privacy on the primary telephone from extension telephones. Also, this type of exclusion system requires manual activation. A second type is an automatic system but requires complicated centralized control equipment and special wiring such that a single line comes into the central control and branches from the central control to one or more telephones. A conversation on one telephone is automatically made private by the central control which switches the other telephones out of the incoming line circuit.

A primary object of this invention is to provide an automatic telephone exclusion system that can automatically provide privacy for any or all telephones in a multi-telephone multi-line communication system. Another object is to provide such an exclusion system having a solid state switch that can be quickly and easily installed to provide such privacy. Another object is to provide such a system that will also permit conference calls. Another object is to provide such an exclusion system which can be applied to such diverse telephone conversation systems as all types of telephone key systems, business or main line stations and extensions, PBX and PABX extensions, answering system subscribers, residence telephones and extensions, and the like. A further object is to provide such an exclusion system which fulfills the above-mentioned objects with no additional system or station wiring, external keys, relays, or power supplies required over and above that required for the telephone communication system per se. Still another object is to provide an exclusion system whereby data can be transmitted over a telephone line without danger of interruption from telephones that share the telephone line.

These and other objects and advantages of this invention will become apparent from the following description in conjunction with the accompanying drawing, of which:

Figure 3:
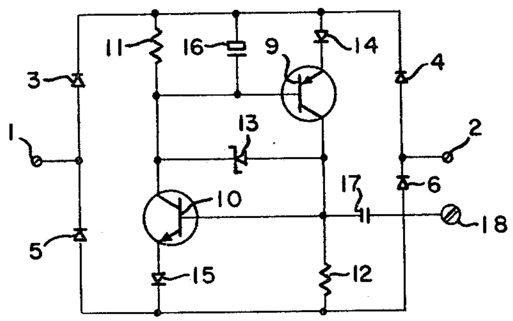
FIGS. 3 and 4 depict other exclusion circuit embodiments of this invention which permit conference calls.
Figure 5:
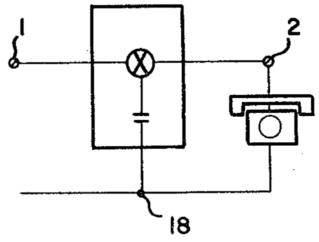

FIG. 5 schematically illustrates the application of a FIG. 3 type circuit to a telephone.

The basic unit of the telephone exclusion system of this invention comprises a solid-state voltage sensitive electronic switch interconnected in series with any telephone input that is to be excluded from an in-progress telephone conversation. When the voltage potential across the switch is above a predetermined level, the switch is activated and completes the line circuit. A preferred form of the switch has the characteristics of being rapidly activatable and slowly deactivatable so that other telephones may be brought into a conference telephone conversation without deactivating the switch.

In general, the exclusion circuit of this invention comprises a diode circuit having an input point and an output point, and having diode means with their polarities arranged such that the exclusion circuit can function regardless of the input polarity and such that current cannot pass from the input point to the output point through the diode circuit alone. The exclusion circuit also comprises semi-conductor voltage breakdown means gating the self-latching semi-conductor means above a predetermined voltage level across the input and output points such that the self-latching semi-conductor means is activated and permits passage of current from the input point to the output point and such that the self-latching semi-conductor means does not become activated and blocks passage of current from the input point to the output point below a predetermined voltage level between the input and output points. Upon activation, the self-latching semi-conductor means remains activated until the telephone circuit is interrupted by placing the associated phone "on hook" thereby interrupting the current to the self-latching semi-conductor means.

In a typical telephone system, in the United States, when the first telephone of a multi-telephone, single-line system is taken off hook, there is a nominal 48 volt D.C. potential from the central office on the telephone line. Depending on the central office battery voltage, length of telephone line and resistance of the telephone instrument itself, the voltage available for any second telephone instrument on the line would be between 4 and 14 volts D.C. Thus, if the aforementioned predetermined voltage level in the exclusion circuit of this invention were set at a value greater than 14 volts D.C., the circuit of this invention could be employed with a telephone instrument to prevent interruption of the busy line by that telephone. For example, when the first telephone, equipped with the circuit of this invention, is taken off hook the 48 volt D.C. potential switches the exclusion circuit on, providing the normal talking and dialing path. Since the voltage available on any other second telephone instrument on the line is below the predetermined voltage required to actuate another exclusive circuit, the A.C. and D.C. currents to a second instrument equipped with an exclusion circuit would be zero, preventing access to this busy line. If the first instrument were to hang up while such a second instrument was off hook, the potential voltage would again revert to 48 volts switching the second instrument on.

The diode circuit is a full wave diode bridge comprising four diodes electrically connected together and to the input and output points (the A.C. apexes of the bridge) such that the first and second diodes are in series, the third and fourth diodes are in parallel legs connected across the input and output points. The first and fourth diodes have the same polarity with respect to the input point, and the second and third diodes have the same polarity with respect to the input point but opposite to the polarity of the first and fourth diodes. A diode circuit of the type maintains correct polarity to the self-latching semi-conductor means (connected across the D.C. apexes of the bridge) regardless of the polarity of the line into which the exclusion circuit is placed. This feature is necessary when line polarity reversal at the calling instrument takes place on the telephone lines when the called party answers their telephone instrument, as occurs in the United States.

The self-latching semi-conductor means, that is, electrically self-latching, is a semi-conductor device or devices, that requires a one-time gate signal to turn on and then remains on, or latched, in a conducting state until a turn-off is received. The self-latching semi-conductor means is connected across the diode circuit between the first and second diodes and between the third and fourth diodes.

The semi-conductor voltage breakdown means is a device or devices, that will not conduct until a threshold voltage is produced thereacross. Such means include Zener diodes, avalanche diodes, shockley diodes, non-diode devices employed so as to function as Zener diodes, and the like. Such means would most likely be one-way semiconductors but need not be inasmuch as their use in the circuits of this invention permit such means to conduct in one direction only. Such means will hereafter be referred to as a Zener diode for simplifying the disclosure.

Figure 1:
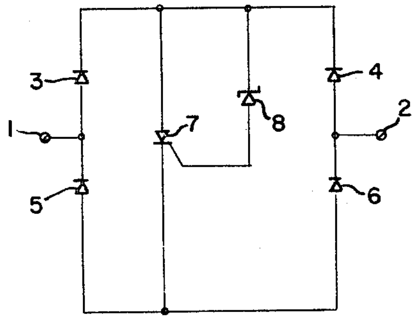
FIG. 1 depicts a basic exclusion circuit embodiment of this invention.

FIG. 1 depicts a basic exclusion circuit having an input point 1, and output point 2, first, second, third and fourth diodes, 3, 4, 5 and 6, respectively, interconnected with each other and with the input and output points and having properly oriented polarities, self-latching semiconductor means in the form of a silicon controlled rectifier 7 with its anode connected between the first and second diodes and with its cathode connected between the third and fourth diodes, and a Zener diode 8 with its cathode connected between the first and second diodes and with its anode connected to the gate of the silicon controlled rectifier.

Figure 2:
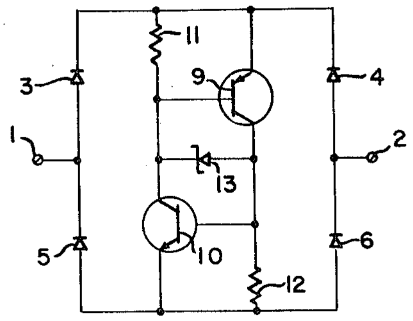
FIG. 2 depicts another basic exclusion circuit embodiment of this invention.

FIG. 2 depicts another basic exclusion circuit wherein the self-latching semi-conductor means comprises a PNP transistor 9 and an NPN transistor 10 interconnected in a positive feedback configuration. The PNP transistor emitter is connected to the diode network at the D.C. apex between the first and second diodes, 3 and 4. The PNP base is connected to the NPN transistor collector, and through resistor 11, to the diode network between the first and second diodes. The PNP collector is connected to the anode of Zener diode 13. The cathode of Zener diode 13 is connected to the NPN transistor collector. The NPN transistor emitter is connected to the diode network at the D.C. apex between the third and fourth diodes, 5 and 6, and the NPN base is connected, through resistor 12, to the diode network between the third and fourth diodes. A Zener diode 13 interconnects the transistor bases with its cathode connected to the NPN collector and its anode connected to the PNP collector. The FIG. 2 basic circuit is preferred to the FIG. 1 circuit because the FIG. 2 circuit may be modified as shown in FIG. 3. The advantages of the FIG. 3 circuit will be described subsequently.

The two transistors shown in the FIG. 2 circuit (PNP and NPN) function as a normally off self-latching switch. Base current to either or both transistors is required to trigger this self-latching switch. The Zener diode is used to perform this triggering function. When the voltage across the exclusion circuit exceeds a predetermined level, for example, 17.5 volts when the exclusion circuit is employed in a telephone system in the United States, the Zene diode breakdown and current is drawn through the two resistors in the circuit. The voltage developed across these resistors will cause current flow in the base circuits—turning on the transistors thus permitting current to flow in the collector circuits. Since the collector of each transistor is tied to the opposite transistor base circuit, any current drawn through the collectors of these transistors will produce more voltage across the collector resistors and in so doing provide more base current for the opposite transistor which in turn will have a similar effect and the device will go into a conducting or self-latched condition. Once the circuit is in the self-latched state, only a large drop in current available to the switch will return it to its normally off condition. (This would take place when the telephone intsrument associated with this device was placed on hook, which opens the telephone lines and therefore drops the current to zero.)

The exclusion circuit depicted in FIG. 3 is similar to the FIG. 2 circuit with the addition of certain components. These components are diodes 14 and 15 in the transistor emitter connections, a capacitor 16 is parallel with resistor 11, and a second capacitor 17 connecting the NPN base to a second output point 18. Diodes 14 and 15 are bias diodes providing temperature stability for the transistors so that the exclusion circuit can operate at higher temperatures. The second capacitor 17 reduces the effect of internal DC leakage and distributive capacitance by inverting the noise signal to the telephone and thereby canceling the effect of the noise signal.

When the switch is in the self-latched or conducting state, the voltage developed across the base-emitter circuit of transistor 9 and diode 14 will cause capacitor 16 to be charged. An interruption of the current flowing through the switch will permit capacitor 16 to discharge and provide base current to the PNP transistor and will hold the PNP transistor in a conducting state for a short period of time. As long as the PNP transistor is held in a conducting state, the NPN transistor will also be held in a conducting state and the exclusion circuit will remain closed as long as capacitor 16 discharges. Thus, the first user can dial in a second telephone by breaking the connection momentarily without dropping himself out of the circuit. This FIG. 3 circuit thus permits conference calls whereas the FIGS. 1 and 2 circuit do not since in these FIGS. 1 and 2 circuits any momentary disruption of the telephone circuit by a first user will automatically cut off the first user. FIG. 5 schematically depicts the installation of the FIG. 3 exclusion circuit in a telephone communication system.

Figure 4:
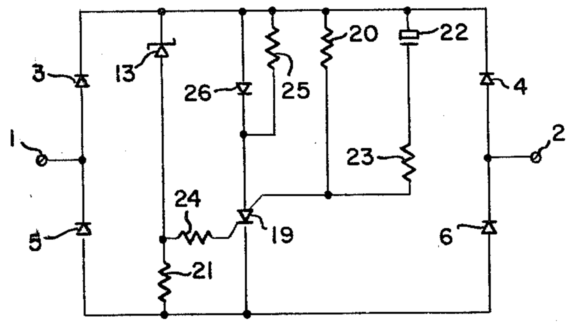

FIG. 4 depicts a preferred exclusion circuit which has all of the desired characteristics of the FIG. 3 circuit without the necessity of employing noise capacitor 17 or a second output point. Further, the self-latching semi-conductor means is simplified without sacrificing the slow cutout feature provided by capacitor 16. In this circuit, the PNP-NPN transistor combination is replaced by its electrical analogue, a PNPN silicon-controlled switch (SCS) 19. This switch is operable over a wider temperature range and is more compact than the PNP-NPN transistor combination of FIG. 3. Resistors 20 and 21 and capacitor 22 function in the same manner as resistors 11 and 12 and capacitor 16 in FIG. 3 and are connected to the self-latching semi-conductor means in analogous manner as the respective components in the FIG. 3 circuit. Resistor 23 is connected in series with capacitor 22 to affect the latter's discharge time constant.

The FIG. 4 circuit operates as follows: When the voltage applied to the input apexes (AC) of the full wave diode bridge (diodes 3 and 5, and 4 and 6) exceeds the critical value determined by the combined bridge diodes (3 and 6, or 4 and 5) and Zener diode characteristics, the Zener diode 13 will conduct permitting current to flow through resistor 21. The resulting voltage developed across resistor 21 is applied via resistor 24 to the cathode gate or silicon control switch 19. The voltage causes the switch to turn on completing a circuit path via diode 26 between the output apexes (DC) of the full wave diode bridge (diodes 3 and 4, 5 and 6) and thus between the input apexes (AC) of the full wave diode bridge (diodes 3 and 5, and 4 and 6). The current flowing through diode 26 and the self-latching switch 19 develops a voltage less than the critical voltage of the Zener diode 13. This diode stops conducting thus the total current flowing between the input apexes (AC) of the full wave diode bridge passes through diode 26 and the self-latching switch 19. The voltage developed across the series circuit consisting of diode 26 and the anode-anode gate junction of switch 19, and resistor 25 providing a sustaining current which maintains switch 19 in the conducting state until a current flow is re-established from the external source, or until capacitor 22 is discharged to a point where the sustaining current is less than a critical value. At this point the switch 19 will revert to the "open" state and the circuit path between the input apexes of the full wave diode bridge will be open. Resistors 20, 21, 24 and 25 stabilize the anode-to-cathode characteristics of switch 19.

It is believed that the invention will have been clearly understood from the foregoing detailed description of our now-preferred illustrated embodiments. Changes in the details of construction may be resorted to without departing from the spirit of the invention and it is accordingly our intention that no limitations be implied and that the hereto annexed claims be given the broadest interpretation to which the employed language fairly admits.

What is claimed is:

1. In combination with a telephone system of the type wherein a plurality of telephones are coupled to a common input line, an exclusion circuit connected in series with at least one of said telephones comprising a diode bridge circuit having two opposite points coupled to said input line, voltage breakdown means coupled to one of the other two opposite points of said bridge circuit for providing a gating current when the voltage on said input line exceeds a predetermined voltage for determining in response to voltage on said input line whether a telephone other than the exclusion circuit telephone is activated, and electrical self-latching means connected between said other two opposite points of said bridge circuit and gated by said breakdown means to conduct between said other two opposite points of said bridge circuit in order to activate said exclusion circuit telephone by passing line voltage thereto when no other telephone is activated and to block current between said other two opposite points of said bridge circuit when said voltage on said input line is less than said predetermined value in order to prevent passage of said activating voltage when any other telephone is activated.

2. The combination of claim 1 wherein said exclusion circuit includes temporary holding means for gating said electrical self-latching means independent of said breakdown means when said exclusion circuit telephone is momentarily deactivated thereby for a short time allowing activation of said exclusion circuit telephone simultaneously with the activation of other telephones.

3. The combination of claim 1 wherein said voltage breakdown means includes a Zener diode.

4. The combination of claim 1 wherein said self-latching means includes a diode bridge connected at AC apexes to said input line to isolate the operation of said self-latching means from changes in polarity of the line voltage.

5. The combination of claim 4 wherein said self-latching means includes a silicon control rectifier connected between the DC apexes of said bridge.

6. The combination of claim 2 wherein said self-latching means includes PNP and NPN transistors interconnected in a positive feedback configuration and said holding means includes a capacitor coupled between a base electrode of one of said transistors and said input line.

7. The combination of claim 2 wherein said self-latching means includes a PNPN semiconductor device having at least one gate electrode and wherein said holding means includes a capacitor coupled between said gate and input line.

8. In combination with a telephone system of the type wherein a plurality of telephones are coupled to a common input line, an exclusion circuit connected in series with at least one of said telephones and operable regardless of the polarity of the signal in the input line, comprising voltage breakdown means connected to said input line for providing a gating current when the voltage in said input line exceeds a predetermined voltage for determining in response to the voltage in said input line whether a telephone other than the exclusion circuit telephone is activated;

electrical self-latching means connected to said input line and gated by said breakdown means to activate said exclusion circuit by passing line current therethrough when no other telephone is activated and to block current therethrough when said voltage in said input line is less than said predetermined voltage when any other telephone is activated;

and diode circuit means interconnecting said voltage breakdown means to the input line such that polarity reversal in said input line will not affect the function of said voltage breakdown means.

References Cited

UNITED STATES PATENTS

| | | | |
|---|---|---|---|
| 3,284,575 | 11/1966 | Howard | 179—31 |
| 3,035,123 | 5/1962 | Nomura | 179—17 |
| 3,155,776 | 11/1964 | Kano et al. | 179—17 |

KATHLEEN H. CLAFFY, Primary Examiner

W. A. HELVESTINE, Assistant Examiner